United States Patent
Alrod et al.

(10) Patent No.: US 9,141,475 B2
(45) Date of Patent: Sep. 22, 2015

(54) METHODS FOR TAG-GROUPING OF BLOCKS IN STORAGE DEVICES

(75) Inventors: Idan Alrod, Herzliya (IL); Eran Sharon, Rishon Lezion (IL)

(73) Assignee: SanDisk Technologies, Plano, TX (US)

( * ) Notice: Subject to any disclaimer, the term of this patent is extended or adjusted under 35 U.S.C. 154(b) by 1828 days.

(21) Appl. No.: 12/276,344

(22) Filed: Nov. 23, 2008

(65) Prior Publication Data

US 2010/0131697 A1 May 27, 2010

(51) Int. Cl.
*G06F 12/02* (2006.01)
*G06F 11/10* (2006.01)

(52) U.S. Cl.
CPC .................................. *G06F 11/1068* (2013.01)

(58) Field of Classification Search
CPC .................................................... G06F 11/1068
USPC .......................................................... 711/103
See application file for complete search history.

(56) References Cited

U.S. PATENT DOCUMENTS

| | | | |
|---|---|---|---|
| 2004/0213035 A1 | 10/2004 | Cavaleri et al. | |
| 2005/0144357 A1* | 6/2005 | Sinclair | 711/103 |
| 2005/0144358 A1 | 6/2005 | Conley et al. | |
| 2006/0039196 A1* | 2/2006 | Gorobets et al. | 365/185.01 |
| 2007/0005928 A1 | 1/2007 | Trika et al. | |
| 2007/0101095 A1 | 5/2007 | Gorobets | |

OTHER PUBLICATIONS

U.S. Appl. No. 12/102,063, Lasser; Menahem et al.

* cited by examiner

*Primary Examiner* — Cheng-Yuan Tseng
*Assistant Examiner* — Ramon A Mercado
(74) *Attorney, Agent, or Firm* — Martine Penilla Group, LLP

(57) ABSTRACT

Embodiments described herein disclose methods, devices, and media for storing data. Methods including the steps of: receiving data to be stored in a memory that includes at least three blocks, wherein each block, for storing the data, has at least one metadata value, associated with each block, that is dependent upon a writing time of each block; grouping at least three blocks into at least two block groups, wherein at least one block group contains at least two blocks; associating a respective metadata value with each block group; and associating the respective metadata value of a respective block group with each block storing the data contained in the respective block group, without storing a dedicated copy of at least one metadata value for each block. In some embodiments, at least one metadata value is stored in a block-group table.

30 Claims, 3 Drawing Sheets

Block Time-Grouping Scheme

METHODS FOR TAG-GROUPING OF BLOCKS IN STORAGE DEVICES

FIELD AND BACKGROUND OF THE INVENTION

Embodiments described herein relate to methods for tag-grouping of blocks in storage devices, and storing control metadata in flash-memory systems.

Flash-memory systems have become very common in recent years. Due to certain characteristics of flash-memory devices, the handling of memory systems based on such devices is not trivial, and requires dedicated software to handle writing to and reading from these devices (thus, simplifying the use of the storage system for the user application). For example, NAND-type flash-memory is typically written (also called "programmed") in chunks called "pages" (typically having the size of 512 bytes to 2K bytes). A flash page should not be written to unless the page is previously erased (i.e. all bits are set to "1"). However, erasing can only be done in chunks called "blocks", with a block typically containing many pages. This significantly complicates the management of flash-memory devices, as data cannot simply be written into a random address without first making sure it is erased, but one cannot arbitrarily erase a target page as its neighboring pages sharing the same block might contain valuable data that should not be erased.

Another example of the complexities of using flash memory is the need for error correction. Flash-memory cells tend to have occasional errors when being read out. The storage system must provide appropriate mechanisms for correcting the data read out before returning the data to the requesting application.

In order to handle the above difficulties (and some others), it is common to access flash-memory systems through a software layer that takes care of all complexities, and provides the accessing application a simple-to-use "world view". Such software layers are commonly called "flash management systems" (FMS) or "flash file systems" (FFS). Typically, such software executes within a flash controller dedicated to controlling and managing flash-memory devices, or within a host system accessing the flash-memory devices in which the software is part of a software driver servicing the storage system.

An FMS typically requires the storing of metadata (also called "control information" or "side information") within the flash memory. Such data is essential for deciding on the right policies and activities to be employed by the FMS. A simple example is the storing of the erase count of each of the blocks in the storage system. Since there is a desire to level out the usage of blocks across the storage system (as blocks wear out with extended use), it is typical for an FMS to maintain, for each block, its number of accumulated erasure cycles, and use this data for deciding on the next block to be allocated for writing new incoming data. There are many more examples of metadata stored in flash-storage systems, some of them common to most systems, and others unique to specific storage systems that employ unique management algorithms. While the present disclosure discusses specific examples of metadata, it should be understood that the methods described herein are equally applicable to all types of metadata that are associated or used with flash-memory storage systems, as long as such metadata types comply with the conditions specified elsewhere in this disclosure as benefiting from the methods disclosed herein.

Many of the metadata types commonly used are block-specific. By block-specific, it is herein meant that the metadata provide some information that is a characteristic of the block as a whole. The above example of an erase count of a block is block-specific. As a block is the minimal unit of erasure, there is no point in providing an erase count for a single page. However, there are metadata types that are page-specific, in the sense that they provide information related only to a specific page, and different pages within the same block may have different metadata values. One common example for page-specific metadata is the error-correction parity bits typically stored with each page of user data to enable error correction when reading to the page. Obviously, the values of these parity bits depend on the specific data stored in a page, and therefore must be page-specific.

Block-specific metadata are much "cheaper" to handle in flash-memory systems than page-specific metadata. This is because block-specific data require just a single entry per block, while page-specific data require an entry per page. Since the number of pages is typically significantly higher than the number of blocks, the handling of page-specific metadata creates great difficulties for an FMS. The difficulties exist both in the need for more metadata space within the flash-memory devices, and in the need for larger amounts of RAM in the flash controller or host system (as the case may be) for storing tables of the metadata values for various pages.

Another example of page-specific metadata is metadata needed by some known methods for improving reading reliability in an FMS by adaptively adjusting the read reference voltages used for reading the flash-memory cells. In one such known method, the EMS keeps track of the adjusted read reference voltages successfully used for reading each page the last time the page was read. Those reference voltages are then used as a starting point the next time a page is read, thereby reducing the number of reading iterations in subsequent reading operations.

The stored last-used reference voltages provide another example of page-specific metadata. Even though all pages in a common block are erased at the same time, and typically have similar threshold-voltage drifting characteristics, their reference-voltage metadata values are not necessarily the same. This is because writing time is not necessarily common, even though erasing time must be common for all pages in a block. Typically, an FMS directs an incoming stream of consecutive, page write-requests into sequential pages in a block. If the stream of pages being written at a first point in time stops at a point that corresponds to a middle of a block, and then starts from there at a later point in time, then the same block would contain some pages written at the first point in time and some pages written at the second point in time.

In more complex scenarios, and depending on the specific algorithms of the FMS, a block might contain pages written at more than two points in time. In certain scenarios (e.g. when the files written to the device are not very large), it is even possible to have each page of a block written at a different point in time. If the host system writes pages at random addresses rather than sequentially, the result is even more likely to be many blocks with pages written at different points in time.

The amount of drifting of the threshold voltages of cells is strongly dependent on the time of writing. For example, a page written a year ago will typically have a significantly higher drift than a page written an hour ago. Drifting only starts after a page is written. Because of this, reference voltage metadata are considered page-specific metadata in a conventional FMS. As such, the handling of reference voltage metadata is subject to difficulties similar to those mentioned above, namely, extra space needed in the flash-memory devices and extra RAM needed in the flash controller or the host system. Accordingly, there is a need for improved handling of page-specific metadata.

In the prior art, methods are known for storing metadata in flash management systems that depend on the time of writing the data to which it is associated. U.S. patent application Ser. No. 12/102,063 by Lasser et al. (hereinafter referred to as Lasser '063) assigned to the assignee of the present disclosure, and incorporated by reference as if fully set forth herein, teaches such methods in which the metadata is stored on a per-page basis.

It would be desirable to have methods for tag-grouping of blocks in storage devices, and storing control metadata in flash-memory systems which handle some page-specific metadata types (e.g. the read reference voltages) as if they are block-specific, while at the same time not sacrificing the accuracy of the metadata values used by the FMS. It is important to note that one may attempt to approximate the metadata values of all pages in a block by keeping only the value related to one page of the block, and using the value as an approximation for all other pages of the same block. But as explained above, there is no guarantee that all pages of the block will have similar value of the metadata, and thus the accuracy of the metadata is compromised.

SUMMARY OF THE INVENTION

It is the purpose of embodiments described herein to provide for tag-grouping of blocks in storage devices, and storing control metadata in flash-memory systems.

For the purpose of clarity, several terms which follow are used as set forth herein. The term "static folding" is used herein to refer to the operation of moving a block in a partition in a device from one location to another due to an update of the block or for the purpose of wear-leveling. In contrast, "dynamic folding" is used herein to refer to the operation of moving a block from one partition to another partition in the device.

The terms "cell-voltage distribution" and "CVD" are used herein to refer to the probability density function of threshold read voltage of cells programmed to the same voltage state (e.g. 2 states in a single-level cell (SLC) and 4 states in a multi-level cell (MLC)). The CVD provides the width or spread of read levels associated with programmed states.

Embodiments described herein provide a tag-grouping mechanism for programmed blocks. Such a mechanism improves the efficiency of reading blocks, reduces the memory requirements for storing reliability information per block, and improves the static-folding procedure of blocks.

Instead of storing metadata for each page as in Lasser '063, embodiments described herein provide for all pages of a block being written substantially simultaneously, and then saving only one copy of the metadata that is common to all the pages in the block. The example metadata used in Lasser '063 is data related to reference voltages used for reading the pages, but this is just one example for such metadata. Many more examples can be contemplated beyond those disclosed in Lasser '063.

Lasser '063 indeed brings a great savings in flash memory as the methods disclosed therein require saving only a single copy of the metadata per each block, regardless of the number of pages per block. However, in some cases such savings might not be good enough, since it would require even storing a single copy for all blocks. If, for example, the metadata required for storing read reference values for a 4-bit-per-cell memory contains 15 reference values, then 15 words in each block must be allocated for these values. Typically, this will have to be allocated in a single page of the block (to avoid reading more than one page for retrieving the metadata), and in many flash-storage systems this is too much.

Since such a problem was not raised before the introduction of forthcoming technologies storing 3 and 4 bits per cell in smaller and smaller physical cell sizes, no prior art exists that discusses keeping such side information specifically for groups of blocks or pages (spanning outside the block boundary). Side information usually refers to data kept aside for usage in relation to a group of cells/pages or blocks (e.g. such data could be reference cells). All other parameters are kept per die, and stored without update in what is called ROM fuse registers of the die that are trimmed during the manufacturing process.

Prior art exists on keeping a counter that is incremented at each program operation in US Patent Publication No. 20070005928 by Trika et al (hereinafter referred to as Trika '928). However, Trika '928 discloses methods which increment on program operation, while the tag-grouping embodiments described herein do not. Methods disclosed in Trika '928 serve for recovery of the last programming operation, rather than a pointer to a table keeping data on a block or page.

US Patent Publication No. 20040213035 by Cavaleri et al. (hereinafter referred to as Cavaleri '035) discloses methods for a counter that is attributed to each sector for counting erase operations. However, Cavaleri '035 does not refer to side information that such a counter points to.

US Patent Publication No. 20050144358 by Conley et al. (hereinafter referred to as Conley '358) discloses methods for a counter associated with programming. However, Conley '358 is related to file system management, not side information required in decoding a block itself.

There is an advantage to handling certain page-specific metadata types (e.g. read reference voltages) as if they were block-specific metadata, while at the same time not sacrificing the accuracy of the metadata values used by the FMS. It is noted that one may attempt to approximate the metadata values of all pages in a block by keeping only the value related to one page of the block, and using the page as an approximation for all other pages of the same block. But as explained above, there is no guarantee that all pages of the block will have similar values of the metadata, and thus, the accuracy of the metadata is compromised. Hence, by handling certain types of page-specific metadata as if they were block-specific metadata, as disclosed herein, the conventional ways of handling page-specific metadata are enhanced. This is substantially achieved without sacrificing the accuracy, or correctness, of the metadata.

Embodiments described herein enable one additional step in saving metadata storage space by sharing metadata fields between multiple blocks, even if the sharing blocks are not written at the same time, and even though the metadata is dependent on the write time of the user data in the blocks (as is the case for the read reference voltages).

Embodiments described herein teach methods for associating multiple blocks into groups using the same metadata values. The grouping is done in a way that blocks in a common group have similar writing times, even though they need not be the same writing time. In implementing such a method, the use of common metadata values, even though an approximation, is still accurate enough for the needs of the FMS. The savings in flash storage space comes from the fact that instead of keeping one copy of metadata per block, one copy per group is kept plus one value per block that identifies the group to which the block belongs. This identifying value is a kind of "time tag" in the sense that the tag associates multiple blocks with somewhat-related writing times (but it should not be confused with "real" writing-time values).

Embodiments described herein teach methods for placing a tag per page, not per block. This is relevant to MLC NAND-type flash memory were the pages in the same block are not necessarily all written substantially at the same time. The tag associates groups of pages in the device, and hence, these groups include pages which do not necessarily belong to the same block. The tag points to a table that holds the metadata corresponding to the tag.

Moreover, the metadata considered in the embodiments described herein are not restricted to the metadata discussed in Lasser '063. The metadata can include new types of side information described below. A typical implementation of the methods described herein includes keeping a tag for read threshold voltages employed in a storage device, while a group is defined as a group of blocks programmed at the same time interval. The time interval could be, for example, the time when the device is powered up, limited to several weeks (e.g. 2-3) of continuous operation. The read threshold voltages can be selected according to a histogram application (as disclosed in Lasser '063).

Embodiments described herein teach methods for adaptively learning the optimal read threshold voltages from a flash-memory device, and adaptively estimating reliabilities of bits stored in the cells based on the read voltages from the device. Such processes generate metadata (i.e. threshold voltages and reliabilities). In order to circumvent the fact the threshold-voltage data, if kept per page, is too large, the methods teach programming a group of blocks at similar times, and keeping a single set of threshold voltages for the entire group of blocks. Each block has a tag (i.e. pointer) to a table placed in a partition holding the set.

Using such an embodiment as an exemplary use-case, upon powering up the device, the metadata (e.g. threshold voltages) are re-estimated from a block that belongs to the last tag. The metadata is then compared to a known initial value of newly-written page. If the last metadata value is different than the known initial value, then the tag is incremented by 1. Alternatively, a time counter can be maintained, and the tag can be incremented every few weeks, for example, of continuous operation. Then, every block written is tagged with the current tag.

Continuing with such an exemplary embodiment, if decoding of a block fails or is slow upon reading the block, the block is accessed for the purpose of updating the metadata. For all subsequent reading of blocks with the same tag, the metadata is automatically updated. Such tagging can be used as the "criteria" for "refreshing" blocks. In an MLC storage device, refreshing blocks would mean static folding of the blocks. In a legacy device, refreshing blocks would mean a "read scrub" of the blocks.

Therefore, according to embodiments described herein, there is provided for the first time a method for storing data, the method including the steps of: (a) receiving data to be stored in a memory that includes at least three blocks, wherein each block, for storing the data, has at least one metadata value, associated with each block, that is dependent upon a writing time of each block; (b) grouping at least three blocks into at least two block groups, wherein at least one block group contains at least two blocks; (c) associating a respective metadata value with each block group; and (d) associating the respective metadata value of a respective block group with each block storing the data contained in the respective block group, without storing a dedicated copy of at least one metadata value for each block.

In some embodiments, at least one metadata value is at least one value selected from the group consisting of: a data age, an optimal-reading threshold-voltage, an optimal-verify threshold-voltage, a number of soft bits read, and data related to error correction.

In some embodiments, at least one metadata value is stored in a block-group table.

In some embodiments, the step of grouping is based on a tag that is common to all blocks in a respective block group, wherein the tag is associated with an approximate relative time of writing the blocks of the respective block group.

In some embodiments, a time since power-up of the memory is divided into time intervals, and wherein two blocks written during different time intervals are associated with different tags.

In some embodiments, two blocks written during two different power-up sessions of the memory are associated with different tags.

According to embodiments described herein, there is provided for the first time a method for storing data, the method including the steps of: (a) receiving data to be stored in a memory that includes at least three blocks, wherein each block, for storing the data, has at least one metadata value, associated with each block, that is dependent upon a writing time of each block; (b) grouping at least three blocks into at least two block groups, wherein at least one block group contains at least two blocks; (c) associating a sequential tag with each block group, wherein a first block group having a previous sequential tag is indicative of being written to earlier in time than a second block group having a subsequent sequential tag; and (d) associating a respective metadata value with each respective sequential tag.

In some embodiments, at least one metadata value is at least one value selected from the group consisting of: a data age, an optimal-reading threshold-voltage, an optimal-verify threshold-voltage, a number of soft bits read, and data related to error correction.

In some embodiments, at least one metadata value is stored in a block-group table.

In some embodiments, a time since power-up of the memory is divided into time intervals, and wherein two blocks written during different time intervals are associated with different tags.

In some embodiments, two blocks written during two different power-up sessions of the memory are associated with different tags.

According to embodiments described herein, there is provided for the first time a method for storing data, the method including the steps of: (a) receiving data to be stored in a memory that includes at least three word-lines, and wherein each word-line, for storing the data, has at least one metadata value, associated with each word-line, that is dependent upon a writing time of each word-line; (b) grouping at least three word-lines into at least two word-line groups, wherein at least one word-line group contains at least two word-lines; (c) associating a respective metadata value with each word-line group; and (d) associating the respective metadata value of a respective word-line group with each word-line storing the data contained in the respective word-line group, without storing a dedicated copy of at least one metadata value for each word-line.

In some embodiments, at least one metadata value is at least one value selected from the group consisting of: a data age, an optimal-reading threshold-voltage, an optimal-verify threshold-voltage, a number of soft bits read, and data related to error correction.

In some embodiments, at least one metadata value is stored in a word-line-group table.

In some embodiments, each word-line is contained in a block, and wherein at least one block contains two word-lines belonging to different word-line groups.

In some embodiments, the step of grouping is based on a tag that is common to all word-lines in a respective word-line group, wherein the tag is associated with an approximate relative time of writing the word-lines of the respective word-line group.

In some embodiments, a time since power-up of the memory is divided into time intervals, and wherein two word-lines written during different time intervals are associated with different tags.

In some embodiments, two word-lines written during two different power-up sessions of the memory are associated with different tags.

According to embodiments described herein, there is provided for the first time a method for storing data, the method including the steps of: (a) receiving data to be stored in a memory that includes at least three word-lines, and wherein each word-line, for storing the data, has at least one metadata value, associated with each word-line, that is dependent upon a writing time of each word-line; (b) grouping at least three word-lines into at least two word-line groups, wherein at least one word-line group contains at least two word-lines; (c) associating a sequential tag with each word-line group, wherein a first word-line group having a previous sequential tag is indicative of being written to earlier in time than a second word-line group having a subsequent sequential tag; and (d) associating a respective metadata value with each respective sequential tag.

In some embodiments, at least one metadata value is at least one value selected from the group consisting of: a data age, an optimal-reading threshold-voltage, an optimal-verify threshold-voltage, a number of soft bits read, and data related to error correction.

In some embodiments, at least one metadata value is stored in a word-line-group table.

In some embodiments, each word-line is contained in a block, and wherein at least one block contains two word-lines belonging to different word-line groups.

According to embodiments described herein, there is provided for the first time a memory device, the device including: (a) a controller for storing data in a memory that includes at least three blocks, wherein each block, for storing the data, has at least one metadata value, associated with each block, that is dependent upon a writing time of each block, the Controller configured for: (i) grouping at least three blocks into at least two block groups, wherein at least one block group contains at least two blocks; (ii) associating a respective metadata value with each block group; and (iii) associating the respective metadata value of a respective block group with each block storing the data contained in the respective block group, without storing a dedicated copy of at least one metadata value for each block.

According to embodiments described herein, there is provided for the first time a memory device, the device including: (a) a controller for storing data in a memory that includes at least three blocks, wherein each block, for storing the data, has at least one metadata value, associated with each block, that is dependent upon a writing time of each block, the controller configured for: (i) grouping at least three blocks into at least two block groups, wherein at least one block group contains at least two blocks; (ii) associating a sequential tag with each block group, wherein a first block group having a previous sequential tag is indicative of being written to earlier in time than a second block group having a subsequent sequential tag; and (iii) associating a respective metadata value with each respective sequential tag.

According to embodiments described herein, there is provided for the first time a memory device, the device including: (a) a controller for storing data in a memory that includes at least three word-lines, wherein each word-line, for storing the data, has at least one metadata value, associated with each word-line, that is dependent upon a writing time of each word-line, the controller configured for: (i) grouping at least three word-lines into at least two word-line groups, wherein at least one word-line group contains at least two word-lines; (ii) associating a respective metadata value with each word-line group; and (iii) associating the respective metadata value of a respective word-line group with each word-line storing the data contained in the respective word-line group, without storing a dedicated copy of at least one metadata value for each word-line.

According to embodiments described herein, there is provided for the first time a memory device, the device including: (a) a controller for storing data in a memory that includes at least three word-lines, wherein each word-line, for storing the data, has at least one metadata value, associated with each word-line, that is dependent upon a writing time of each word-line, the controller configured for: (i) grouping at least three word-lines into at least two word-line groups, wherein at least one word-line group contains at least two word-lines; (ii) associating a sequential tag with each word-line group, wherein a first word-line group having a previous sequential tag is indicative of being written to earlier in time than a second word-line group having a subsequent sequential tag; and (iii) associating a respective metadata value with each respective sequential tag.

According to embodiments described herein, there is provided for the first time a computer-readable storage medium having computer-readable code embodied therein, the computer-readable code including: (a) driver code for a memory device having a memory that includes at least three blocks, wherein each block, for storing data, has at least one metadata value, associated with each block, that is dependent upon a writing time of each block, the driver code configured for: (i) grouping at least three blocks into at least two block groups, wherein at least one block group contains at least two blocks; (ii) associating a respective metadata value with each block group; and (iii) associating the respective metadata value of a respective block group with each block storing the data contained in the respective block group, without storing a dedicated copy of at least one metadata value for each block.

According to embodiments described herein, there is provided for the first time a computer-readable storage medium having computer-readable code embodied therein, the computer-readable code including: (a) driver code for a memory device having a memory that includes at least three blocks, wherein each block, for storing data, has at least one metadata value, associated with each block, that is dependent upon a writing time of each block, the driver code configured for: (i) grouping at least three blocks into at least two block groups, wherein at least one block group contains at least two blocks; (ii) associating a sequential tag with each block group, wherein a first block group having a previous sequential tag is indicative of being written to earlier in time than a second block group having a subsequent sequential tag; and (iii) associating a respective metadata value with each respective sequential tag.

According to embodiments described herein, there is provided for the first time a computer-readable storage medium having computer-readable code embodied therein, the computer-readable code including: (a) driver code for a memory device having a memory that includes at least three word-lines, wherein each word-lines, for storing data, has at least one metadata value, associated with each word-Lines, that is dependent upon a writing time of each word-lines, the driver code configured for: (i) grouping at least three word-lines into at least two word-line groups, wherein at least one word-line group contains at least two word-lines; (ii) associating a respective metadata value with each word-line group; and (iii) associating the respective metadata value of a respective word-line group with each word-line storing the data contained in the respective word-line group, without storing a dedicated copy of at least one metadata value for each word-line.

According to embodiments described herein, there is provided for the first time a computer-readable storage medium having computer-readable code embodied therein, the computer-readable code including: (a) driver code for a memory device having a memory that includes at least three word-lines, wherein each word-lines, for storing data, has at least one metadata value, associated with each word-lines, that is dependent upon a writing time of each word-lines, the driver code configured for: (i) grouping at least three word-lines into at least two word-line groups, wherein at least one word-line group contains at least two word-lines; (ii) associating a sequential tag with each word-line group, wherein a first word-line group having a previous sequential tag is indicative of being written to earlier in time than a second word-line group having a subsequent sequential tag; and (iii) associating a respective metadata value with each respective sequential tag.

These and further embodiments will be apparent from the detailed description and examples that follow.

BRIEF DESCRIPTION OF THE DRAWINGS

Embodiments are herein described, by way of example only, with reference to the accompanying drawings, wherein.

DESCRIPTION OF THE PREFERRED EMBODIMENTS

Embodiments described herein relate to methods for tag-grouping of blocks in storage devices, and storing control metadata in flash-memory systems. The principles and operation for tag-grouping of blocks in storage devices, according to embodiments described herein, may be better understood with reference to the accompanying description and the drawings.

Various embodiments of methods and systems disclosed herein are particularly useful for a certain class of metadata types. Page-specific metadata are dependent on page-writing time. Such metadata are referred to herein as "write-time-dependent metadata". The read reference voltages metadata mentioned above as one example of page-specific metadata are write-time-dependent, as the value of the drift, and consequently the value of the read reference voltages expected to offset the drift, is dependent on the time of writing the page. However, not all page-specific metadata are write-time-dependent. The error correction parity bits mentioned above as another example of page-specific metadata do not depend on the time of writing the page, but rather on the data contents of the page. Thus, such bits are not write-time-dependent.

Specific exemplary embodiments are described below. It is to be understood that the scope of the appended claims is not limited to the exemplary embodiments disclosed. It should also be understood that not every feature of the presently disclosed methods, devices, and computer-readable codes for managing flash memory storage systems is necessary to implement a method, a device, or a computer-readable medium as claimed in any particular one of the appended claims. Various elements and features of devices are described to fully enable the appended claims. It should also be understood that throughout this disclosure, where a process or method is shown or described, the steps of the method may be performed in any order or simultaneously, unless it is clear from the context that one step depends on another step being performed first.

Figure 1:
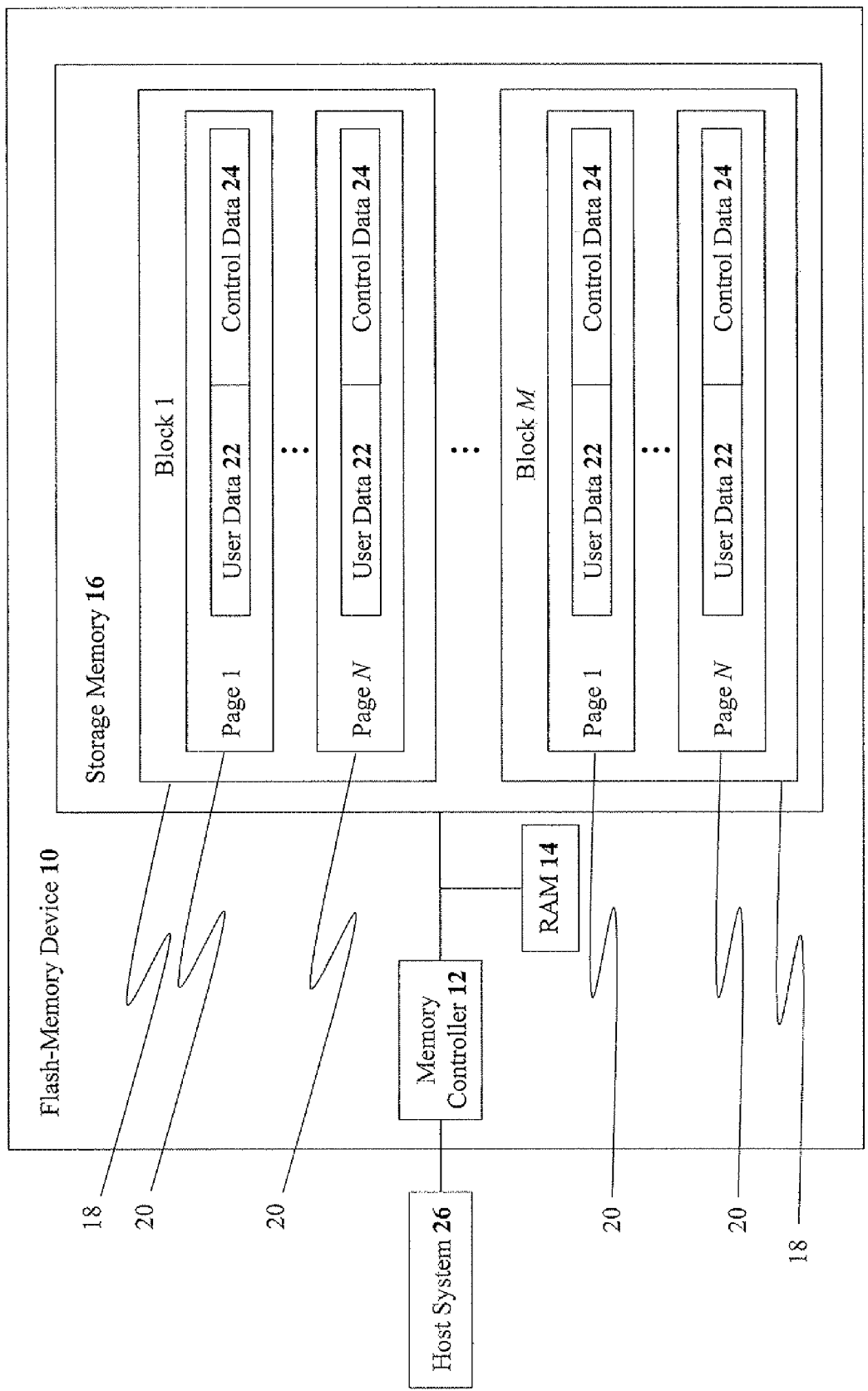
FIG. 1 is a simplified schematic block diagram of a flash-memory device, according to embodiments described herein.

Referring now to the drawings, FIG. 1 is a simplified schematic block diagram of a flash-memory device, according to embodiments described herein. A flash-memory device 10 is shown having a controller 12, a RAM 14, and a flash memory 16. Flash memory 16 includes a plurality of flash memory cells arranged in M blocks 18. Each block 18 includes N pages 20. Each page 20 includes areas for user data 22 and control data 24 for storing metadata. Controller 12 manages flash memory 16 with the help of RAM 14. In particular, controller 12 reads and writes user data 22 from and to designated blocks 18 of flash memory 16. Flash-memory device 10 is shown in FIG. 1 interacting with a host system 26.

Controller 12 may be implemented using any combination of hardware (e.g. including a microprocessor, and optionally, volatile memory such as RAM (in place of, or in addition to, RAM 14) or registers), firmware, and/or software (e.g. computer code that is stored in volatile or non-volatile memory, and is executable by a microprocessor). Among the hardware/firmware configurations that are suitable for controller 12 are, as examples, Application-Specific Integrated Circuits (ASIC), Field-Programmable Gate Arrays (FPGA), and Field-Programmable Logic Arrays (FPLA).

Figure 2:
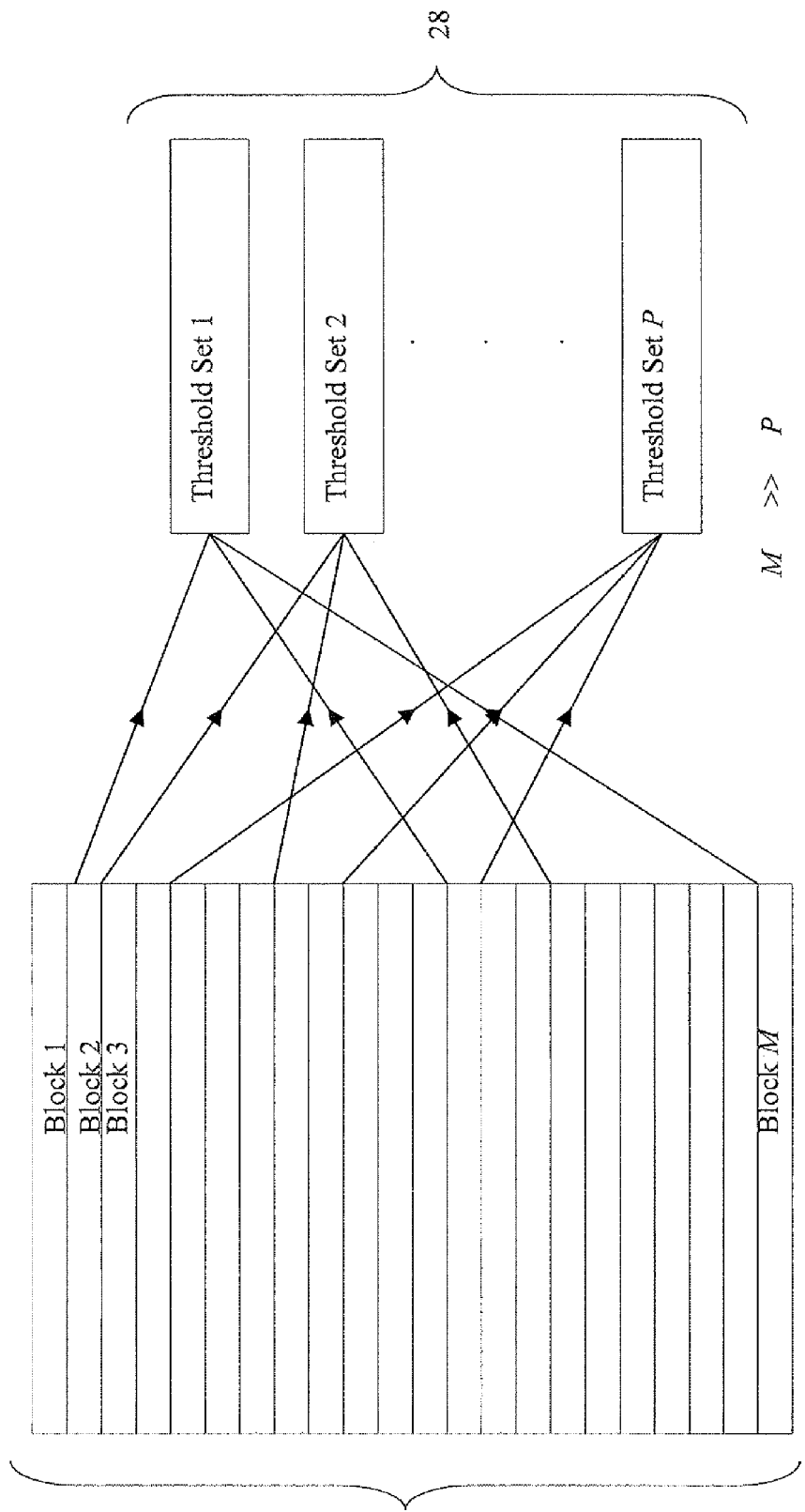
FIG. 2 is a simplified schematic high-level block diagram of the blocks shown in FIG. 1, according to embodiments described herein.

FIG. 2 is a simplified schematic high-level block diagram of the blocks shown in FIG. 1, according to embodiments described herein. Blocks 18 are tagged to P threshold sets 28, in which M, the number of blocks 18, is much greater than P, the number of threshold sets 28.

The metadata related to a group of blocks 18 or a group of pages 20 in FIG. 1 can include the following information:

(1) Optimal reading threshold voltages—used when reading a page/block in order to minimize the error rates. The optimal reading threshold voltages are computed based on the estimated CVD. CVD-tracking algorithms can be used to maintain an updated estimate of the CVD.

(2) Reading resolution—used when reading a page. The reading resolution is measured by the number of soft bits read on top of the stored bits. For example, in a D4 flash-memory device, 0 soft bits correspond to reading the flash memory with 16 read levels (i.e. 4 bits are read per cell), 1 soft bit corresponds to reading the flash memory with 32 read levels (i.e. 5 bits are read per cell), 2 soft bits correspond to reading the flash memory with 64 read levels (i.e. 6 bits are read per cell), and so on. When higher error rates are anticipated, it is necessary to read with higher resolution in order to improve error-correction capability (ECC). The expected error rates are estimated based on the estimated CVD.

(3) CVD parameters—used in order to compute initial soft estimates of the stored bits that will be used by a soft input ECC decoder. A soft estimate of a bit is generated from a hard estimate of the bit value (i.e. 0 or 1), and a reliability of the estimate (e.g. a number representing the probability that the bit estimate is correct). A commonly-used approach for representing these combined values is to turn them into a "two's complement" number (hereinafter referred to as "2C") with positive values representing "zeroes" and negative values representing "ones". The 2C of a bin number is defined as the value obtained by subtracting the number from a large power of two (specifically, from $2^N$ for an N-bit 2C). In such a system, negative numbers are represented by the 2C of the absolute value. This system is the most common method of representing signed integers on computers. In such a system, a number is negated (converted from positive to negative or vice versa) by computing its 2C. A higher absolute value of the 2C representation refers to a higher probability of the hard-bit representation to be correct, while a smaller absolute value of the 2C representation (i.e. approaching zero) translates into a lower probability for the hard-bit estimation to be correct. In this representation, the sign of the 2C representation includes the hard-bit estimate, while the amplitude of the 2C representation corresponds to the reliability measure (i.e. the a priori probability for a hard bit to have a correct value; thus, the reliability measure is a predetermined number computed off-line).

(4) Table (or table index) of soft-bit estimates—instead of storing the CVD parameters (as outlined above in (3)), pre-computed tables with initial bit estimates for different CVD parameters are stored. This is done in order to avoid computation of the initial-bit estimates on-line (which can be complex). Instead, the initial-bit estimates of the bits stored in a cell for every possible read value of the cell are pre-computed, and stored in a table. For example, in D4 flash memory having a reading resolution of 16 voltage levels, a 16×4 pre-computed table with initial-bit estimates is used. For every possible read value, 4 soft-bit estimates are stored for the 4 bits stored in the cell. Several such pre-computed tables are stored for different reading resolutions and different CVD parameters (i.e. different error rates). In the metadata, the table itself is not stored, only a pointer/tag is stored (i.e. an index of the table).

In order to associate every programmed block 18 with a tag, a method for generating the tag in flash-memory device 10 is needed. Whenever the device is powered up, the tag is read from the management area of flash memory 16. The tag is incremented if:

(1) there is a block 18 in flash memory 16 already associated with the tag read from flash memory 16 (e.g. this can be indicated by a 1-bit flag); and (2) flash-memory device 10 was just powered up, or a given amount of time (e.g. 1 week) has passed without the device being powered down.

Every block 18 which is being folded into a partition is tagged with the current tag (i.e. for each block 18, the tag is stored either in a virtual-to-physical (VTP) table, or in a "dummy" word-line (WL)). An additional table is maintained, which associates tags with the number of soft bits and optimal reading threshold voltages. This table is referred to as the "block-time" (BT) table. Other time-dependent parameters with less time sensitivity can also be kept in a separate table. For example, such parameter could be the $V_{read}$ of the next WL during a read operation.

Whenever a block 18 having tag t is read, the BT table is checked for an entry with tag t'≥t which is as close as possible to t. The number of soft bits and optimal reading threshold voltages associated with tag t' in the BT table is used in order to read the designated block 18. In a similar manner, programming steps are extracted, and optimal reading threshold voltages are verified, from BT table with tag t'.

After the designated block 18 is read, the entry of tag t in the BT table is updated with the correct number of soft bits and optimal reading threshold voltages used for successful block reading, if necessary (i.e. if tag t does not appear in the BT table, or if tag t appears with a different number of soft bits and/or optimal reading threshold voltages than the ones that were actually used for successfully reading the designated block 18). Note that it is also advisable to update the values in the BT table in the background whenever necessary (e.g. failure to decode, or slower decoding).

The tag associated with each block 18 can also be used for improving the static-folding procedure. Currently, the criterion for choosing a block 18 for static folding is based only on its number of write/erase (W/E) cycles. The tag of the block can be used in order to choose a block among all blocks having the same W/E cycles (i.e. the block with the smallest tag is chosen, since such a block is the one suffering from the most severe data retention (DR)).

Such a method for storing the data provides several advantages.

(1) More efficient reading—reduces the number of trial and error attempts of the SECC (Single-Error-Correcting Code). Assume a movie is stored on many blocks. The SECC will "work hard" on decoding the first page in the first block, determining the optimal number of soft bits and optimal reading threshold voltages. The rest of the pages in the block, and the rest of the blocks in the movie, will be immediately decoded using the correct configuration. Hence, an efficient pipeline can be maintained. There is only small delay before the beginning of the movie, but a "smooth reading" of the movie.

(2) Smaller flash memory requirement for storing reliability information on the blocks—the number of soft bits and the optimal reading threshold voltages are not stored per block, but per tag (i.e. typically, for many blocks). That is also the case for equalizer taps and possible programming step-size.

(3) More efficient static-folding procedure—choosing a block for static folding can be done not only based on its W/E cycles, but also based on its DR. The tags are proportional to the amount of DR that a block has suffered.

In order to make sure that the tag "counter" does not overflow, and at the same time use a small number of bits for storing the tag, the tag can be implemented as a cyclic counter. In such an implementation, it is necessary to store not only the tag in the device, but also where the tag starts.

For example, using an 8-bit counter, the counter is incremented modulo 256. If all the 256 tags are already used, the counter is not incremented anymore. Such a situation indicates that static folding should be performed as soon as possible.

Whenever a block is statically folded, the device checks whether there are other blocks with the same tag. If not, then the tag is free. Thus, the tag's entry from the BT table can be removed, and the starting point of the counter can be updated.

For example, assume the current starting point of the counter is 5, and the counter is set on 180. Furthermore, assume that there is a block with tag 5, and then there are no blocks up to tag 20. Then, once the block with tag 5 is statically folded, the block is assigned with the current tag (i.e. 180), and the starting point of the counter is updated from 5 to 20.

Now, consider the situation where no static folding takes place, and the counter is being incremented (either because of many power-ups of the device, or because the device has been operating for a long time without a power-down) up to the value of 19 (i.e. 180, 181, . . . , 255, 0, 1, . . . , 19). Then, once the counter reaches 19, the counter cannot be incremented anymore until static folding will "free up" some tags.

The tag-grouping procedure described above deals with grouping entire blocks into a set which includes similar characteristics of side information; however, as pointed out in above, it could be the case that groups of word-lines are the ones that have substantial similarities, not the blocks. It might be the case that pages (or WLs) should be grouped instead of blocks, since the metadata will be the same for groups of pages, and not for groups of blocks. Within a group of blocks that were programmed roughly at the same time, it is expected there will be a few fixed subgroups of pages, such that each subgroup will have the same metadata (i.e. the same CVD). Hence, for each tag, a few sets of metadata need to be stored, one set for each subgroup of pages related to the tag.

In such a situation, there are two options:

(1) Each block is separately divided into groups of WLs, and the same tag points to the BT-table entry that includes the side information for these few WL groups. This means that in the entire group of blocks pointed to by the tag, the side information has different values according to the number of WLs within the group.

(2) The WLs are independent from the block altogether (i.e. for each WL, there is a tag which could be associated with time or not). This tag points to the BT-table entry that provides the necessary side information for the group of WLs independent of the grouping of blocks. Indeed, more pointers are kept in the flash tables; however, in the case that the number of groups of WLs in the entire device is small, such a clustering scenario could provide an advantage.

An exemplary embodiment for option (2) described above is the case of programming steps. Assume that, based on measurements, different WLs have different reliabilities, or their CVD is different. Therefore, in more reliable WLs, the controller may use larger step sizes. As a result, the controller can increase the programming speed, while in other WLs, for which the CVD is wider, smaller step sizes should be employed in order to maintain approximately equal reliability among the different WLs.

Currently, the worst-case WL is taken into consideration for ECC design, while the system takes no advantage from the fact that other WLs with improved reliability could be programmed faster. In such a case, the tag can define groups of WLs according to their reliability, holding the programming step-size as the side information metadata, while the classification is done independently from the block number. This classification can be performed adaptively during the manufacturing process such that the classification varies according to the batch of wafers produced.

Figure 3:
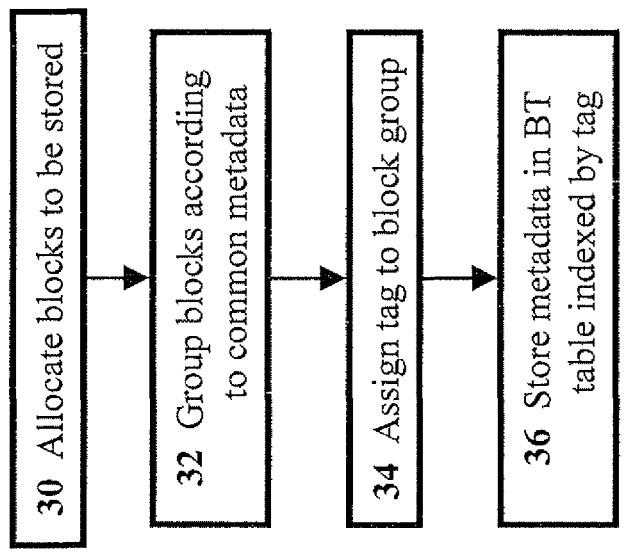
FIG. 3 is a simplified flowchart for the general process of tag-grouping of blocks, according to embodiments described herein.

FIG. 3 is a simplified flowchart for the general process of tag-grouping of blocks, according to embodiments described herein. Blocks are allocated to be stored, or otherwise accessed (Step 30). Blocks are grouped according to common metadata (Step 32). A tag is assigned to the block group (Step 34). The metadata is then stored in the BT table indexed by tag (Step 36).

While the invention has been described with respect to a limited number of embodiments, it will be appreciated that many variations, modifications, and other applications of the invention may be made.

What is claimed is:

1. A method for storing data, the method comprising the steps of:
    (a) receiving data to be stored in a memory that includes a plurality of blocks, wherein each block from the plurality of blocks has at least one block metadata value associated with said each block, said block metadata value being dependent upon a writing time of said each block;
    (b) grouping said plurality of blocks into block groups, wherein at least one block group contains at least two blocks;
    (c) associating a group metadata value with each block group; and
    (d) associating each group metadata value with each block in a respective block group, wherein each block from the plurality of blocks does not store a dedicated copy of said block metadata value, and each block utilizes the group metadata value instead of the block metadata value.

2. The method of claim 1, wherein said group metadata value is value selected from a group consisting of: a data age, an optimal-reading threshold-voltage, an optimal-verify threshold-voltage, a number of soft bits read, or data related to error correction.

3. The method of claim 1, wherein said group metadata value is stored in a block-group table.

4. The method of claim 1, wherein said step of grouping is based on a tag that is common to all blocks in a block group, wherein said tag is associated with an approximate relative time for writing said blocks of said block group.

5. The method of claim 4, wherein a time since power-up of said memory is divided into time intervals, and wherein blocks written during different time intervals are associated with different tags.

6. The method of claim 5, wherein blocks written during two different power-up sessions of said memory are associated with different tags.

7. A method for storing data, the method comprising the steps of:
    (a) receiving data to be stored in a memory that includes a plurality of blocks, wherein each block from the plurality of blocks has at least one block metadata value associated with said each block, said block metadata value being dependent upon a writing time of said each block;
    (b) grouping said plurality of blocks into block groups, wherein at least one said block group contains at least two blocks;
    (c) associating a sequential tag with each block group, wherein blocks in a first block group having a previous sequential tag are written before blocks in a second block group having a subsequent sequential tag; and
    (d) associating a group metadata value with each respective sequential tag, wherein each block from the plurality of blocks does not store a dedicated copy of said block metadata value, and each block utilizes the group metadata value instead of the block metadata value.

8. The method of claim 7, wherein said group metadata value is selected from a group consisting of: a data age, an optimal-reading threshold-voltage, an optimal-verify threshold-voltage, a number of soft bits read, or data related to error correction.

9. The method of claim 7, wherein said group metadata value is stored in a block-group table.

10. The method of claim 7, wherein a time since power-up of said memory is divided into time intervals, and wherein blocks written during different time intervals are associated with different tags.

11. The method of claim 10, wherein two blocks written during two different power-up sessions of said memory are associated with different tags.

12. A method for storing data, the method comprising the steps of:
(a) receiving data to be stored in a memory that includes a plurality of word-lines, and wherein each word-line has at least one line metadata value associated with said each word-line, said line metadata value being dependent upon a writing time of said each word-line;
(b) grouping said plurality of word-lines into word-line groups, wherein at least one word-line group contains at least two word-lines;
(c) associating a group metadata value with each word-line group; and
(d) associating each group metadata value with each word-line in a respective word-line group, wherein each word-line from the plurality of word-lines does not store a dedicated copy of said group metadata value.

13. The method of claim 12, wherein said group metadata value is selected from a group consisting of: a data age, an optimal-reading threshold-voltage, an optimal-verify threshold-voltage, a number of soft bits read, or data related to error correction.

14. The method of claim 12, wherein said group metadata value is stored in a word-line-group table.

15. The method of claim 12, wherein each said word-line is contained in a block, and wherein at least one block contains two word-lines belonging to different word-line groups.

16. The method of claim 12, wherein said step of grouping is based on a tag that is common to all word-lines in a word-line group, wherein said tag is associated with an approximate relative time for writing said word-lines of said word-line group.

17. The method of claim 16, wherein a time since power-up of said memory is divided into time intervals, and wherein word-lines written during different time intervals are associated with different tags.

18. The method of claim 16, wherein word-lines written during two different power-up sessions of said memory are associated with different tags.

19. A method for storing data, the method comprising the steps of:
(a) receiving data to be stored in a memory that includes a plurality of word-lines, and wherein each word-line has at least one line metadata value associated with said each word-line, said line metadata value being dependent upon a writing time of said each word-line;
(b) grouping said plurality of word-lines into word-line groups, wherein at least one word-line group contains at least two word-lines;
(c) associating a sequential tag with each word-line group, wherein word-lines in a first word-line group having a previous sequential tag are written before blocks in a second word-line group having a subsequent sequential tag; and
(d) associating a group metadata value with each respective sequential tag, wherein each word-line from the plurality of word-lines does not store a dedicated copy of said line metadata value, and each word-line utilizes the group metadata value instead of the line metadata value.

20. The method of claim 19, wherein said group metadata value is selected from a group consisting of: a data age, an optimal-reading threshold-voltage, an optimal-verify threshold-voltage, a number of soft bits read, or data related to error correction.

21. The method of claim 19, wherein said group metadata value is stored in a word-line-group table.

22. The method of claim 19, wherein each said word-line is contained in a block, and wherein at least one block contains two word-lines belonging to different word-line groups.

23. A memory device comprising:
(a) a controller for storing data in a memory that includes a plurality of blocks, wherein each block from the plurality of blocks has at least one block metadata value associated with said each block, said block metadata value being dependent upon a writing time of said each block, said controller configured for:
(i) grouping said plurality of blocks into block groups, wherein at least one block group contains at least two blocks;
(ii) associating a group metadata value with each block group; and
(iii) associating each group metadata value with each block in a respective block group, wherein each block from the plurality of blocks does not store a dedicated copy of said block metadata value, and each block utilizes the group metadata value instead of the block metadata value.

24. A memory device comprising:
(a) a controller for storing data in a memory that includes a plurality of blocks, wherein each block from the plurality of blocks has at least one block metadata value associated with said each block, said block metadata value being dependent upon a writing time of said each block, said controller configured for:
(i) grouping said plurality of blocks into block groups, wherein at least one block group contains at least two blocks;
(ii) associating a sequential tag with each block group, wherein blocks in a first block group having a previous sequential tag are written before blocks in a second block group having a subsequent sequential tag; and
(iii) associating a group metadata value with each respective sequential tag, wherein each block from the plurality of blocks does not store a dedicated copy of said block metadata value, and each block utilizes the group metadata value instead of the block metadata value.

25. A memory device comprising:
(a) a controller for storing data in a memory that includes a plurality of word-lines, wherein each word-line has at least one line metadata value associated with said each word-line, said line metadata value being dependent upon a writing time of said each word-line, said controller configured for:
(i) grouping said plurality of word-lines into at least two word-line groups, wherein at least one word-line group contains at least two word-lines;
(ii) associating a group metadata value with each word-line group; and
(iii) associating each group metadata value with each word-line in a respective word-line group, wherein each word-line from the plurality of word-lines does not store a dedicated copy of said group metadata value.

26. A memory device comprising:
(a) a controller for storing data in a memory that includes a plurality of word-lines, wherein each word-line has at least one line metadata value associated with said each word-line, said line metadata value being dependent upon a writing time of said each word-line, said controller configured for:
(i) grouping said plurality of word-lines into word-line groups, wherein at least one word-line group contains at least two word-lines;
(ii) associating a sequential tag with each word-line group, wherein word-lines in a first word-line group having a previous sequential tag are written before blocks in a second word-line group having a subsequent sequential tag; and
(iii) associating a group metadata value with each respective sequential tag, wherein each word-line from the plurality of word-lines does not store a dedicated copy of said line metadata value, and each word-line utilizes the group metadata value instead of the line metadata value.

27. A computer-readable non-transitory storage medium having computer-readable code embodied therein, the computer-readable code comprising:
(a) driver code for a memory device having a memory that includes a plurality of blocks, wherein each block from the plurality of blocks has at least one block metadata value associated with said each block, said block metadata value being dependent upon a writing time of said each block, said driver code configured for:
(i) grouping said plurality of blocks into block groups, wherein at least one block group contains at least two blocks;
(ii) associating a group metadata value with each block group; and
(iii) associating each group metadata value with each block in a respective block group, wherein each block from the plurality of blocks does not store a dedicated copy of said block metadata value, and each block utilizes the group metadata value instead of the block metadata value.

28. A computer-readable non-transitory storage medium having computer-readable code embodied therein, the computer-readable code comprising:
(a) driver code for a memory device having a that includes a plurality of blocks, wherein each block from the plurality of blocks has at least one block metadata value associated with said each block, said block metadata value being dependent upon a writing time of said each block, said driver code configured for:
(i) grouping said plurality of blocks into block groups, wherein at least one block group contains at least two blocks;
(ii) associating a sequential tag with each block group, wherein blocks in a first block group having a previous sequential tag are written before blocks in a second block group having a subsequent sequential tag; and
(iii) associating a group metadata value with each respective sequential tag, wherein each block from the plurality of blocks does not store a dedicated copy of said block metadata value, and each block utilizes the group metadata value instead of the block metadata value.

29. A computer-readable non-transitory storage medium having computer-readable code embodied therein, the computer-readable code comprising:
(a) driver code for a memory device having a memory that includes a plurality of word-lines, and wherein each word-line has at least one line metadata value associated with said each word-line, said line metadata value being dependent upon a writing time of said each word-line, said driver code configured for:
(i) grouping said plurality of word-lines into word-line groups, wherein at least one word-line group contains at least two word-lines;
(ii) associating a group metadata value with each word-line group; and
(iii) associating each group metadata value with each word-line in a respective word-line group, wherein each word-line from the plurality of word-lines does not store a dedicated copy of said group metadata value.

30. A computer-readable non-transitory storage medium having computer-readable code embodied therein, the computer-readable code comprising:
(a) driver code for a memory device having a memory that includes a plurality of word-lines, and wherein each word-line has at least one line metadata value associated with said each word-line, said line metadata value being dependent upon a writing time of said each word-line, said driver code configured for:
(i) grouping said plurality of word-lines into word-line groups, wherein at least one word-line group contains at least two word-lines;
(ii) associating a sequential tag with each word-line group, wherein word-lines in a first word-line group having a previous sequential tag are written before blocks in a second word-line group having a subsequent sequential tag; and
(iii) associating a group metadata value with each respective sequential tag, wherein each word-line from the plurality of word-lines does not store a dedicated copy of said line metadata value, and each word-line utilizes the group metadata value instead of the line metadata value.

* * * * *